Patented July 1, 1952

2,602,075

UNITED STATES PATENT OFFICE 2,602,075

PRODUCTION OF THERMOPLASTIC RESINS AND THE PRODUCTION FROM SUCH RESINS OF THREADS, FIBRES, FILAMENTS, AND THE LIKE

Albert Stanley Carpenter, Sutton Coldfield, Birmingham, England, Frank Reeder, Killay, Swansea, Wales, and Eric R. Wallsgrove, Coventry, England, assignors to Courtaulds Limited, London, England, a British company No Drawing. Application November 1, 1949, Serial No. 124,944. In Great Britain November 26, 1948

12 Claims. (Cl. 260—47)

This invention relates to the production of thermoplastic resins and to the production from such resins of threads, fibres, filaments, monofils and the like, hereinafter generally referred to as "threads."

It is known to produce thermosetting synthetic resins by condensing phenols with glycerine or glycerine derivatives. Thus United States patent specification No. 1,642,078 describes the production of insoluble and infusible resins suitable as shellac substitutes by heating a phenol with glycerine or with a derivative of glycerine such as epichlorhydrin, in the presence of small quantities of a catalyst, which may be acidic or basic, to form an initial condensation product and then condensing this product with a hardening agent such as hexamethylene tetramine.

It is also known to react phenols, which may be monohydric or dihydric, with epichlorhydrin in alkaline solution in order to produce a derivative which can then be used for forming thermosetting resins. For example in British specification No. 518,057 it has been proposed to form thermosetting resins by condensing an ethylene oxide-phenol derivative (obtained by reacting a phenol with epichlorhydrin in alkaline solution) with the anhydride of an acid which is at least dibasic, and in British specification No. 579,698 it has been proposed to form thermosetting resins by polymerising products containing at least two ethylene-oxide groups and which are obtained by the reaction of the phenolic hydroxyl groups of a dihydric phenol with epichlorhydrin or alpha di-chlorhydrin in the presence of alkali.

In the Receuil des Travaux Chimique de Pays Bas, vol. 67 (1948), pages 438 to 441, E. G. G. Werner and E. Farenhorst have described the production of aromatic bis-glycidyl ethers by reacting a phenol such as hydroquinone or resorcinol with an excess of epichlorhydrin in the presence of alkali; it is stated that in the presence of excess alkali, high molecular polycondensate products may be formed and also that the aromatic bis-glycidyl ether obtained from hydroquinone polymerises in the presence of sodium hydroxide to form an infusible, insoluble product.

It has been disclosed, for example in Journal de Pharmacie et de Chimie, volume 18 (1933), page 189 and in British patent specification No. 420,078, that equimolecular proportions of epichlorhydrin, pyrocatechol and caustic potash condense with ring closure on being heated together in a stream of nitrogen to form 5-(hydroxymethyl)-2,3-benzodioxane 1,4.

The object of the present invention is to produce thermoplastic resinous products which are in general suitable for the production of threads, particularly threads capable of being cold drawn.

In accordance with the present invention, a process for the production of thermoplastic resins comprises condensing by heating, substantially equimolecular proportions of epichlorhydrin and at least one aromatic dihydroxy compound in which the hydroxy groups are phenolic and the carbon atoms linked to the hydroxyl groups are separated by at least one other carbon atom, together with a quantity of an alkali such that the ratio of the number of molecules of alkali to the number of molecules of the dihydroxy compound is at least 1.0, the heating being continued until a fibre-forming resinous product is obtained.

In accordance with one modification of the invention, thermoplastic resins are obtained from substantially equimolecular proportions of an aromatic dihydroxy compound as defined and epichlorhydrin, together with a quantity of an alkali such that the ratio of the number of molecules of alkali to the number of molecules of the dihydroxy compound is at least 1.0, by a two-stage process in which the epichlorhydrin is first reacted with from 50 to 100 per cent of the dihydroxy compound and the product obtained is then heated with the alkali and any remaining dihydroxy compound, until a fibre-forming resinous product is obtained.

In accordance with a further modification of the invention, thermoplastic resins are obtained from substantially equimolecular proportions of an aromatic dihydroxy compound as defined and epichlorhydrin, together with a quantity of an alkali such that the ratio of the number of molecules of alkali to the number of molecules of the dihydroxy compound is at least 1.0, by a two-stage process in which one mol of the dihydroxy compound is first reacted with two mols of epichlorhydrin and the alkali to form an aromatic bis-glycidyl ether and then the aromatic bis-glycidyl ether is heated with a further mol of a dihydroxy compound as defined together with a small proportion of an alkali catalyst, the heating being continued until a resinous fibre-forming product is obtained. The aromatic bis-glycidyl ethers prepared in the first stage of this reaction may be made substantially as described by E. G. G. Werner and E. Farenhorst in the paper referred to above; this paper states that the aromatic bis-glycidyl ether obtained from hydroquinone is polymerised in the presence of sodium hydroxide to form an infusible, insoluble product. When carrying out the second stage of the process according to the present invention it is preferred to prevent as far as possible the formation of infusible resins for example by adding the bis-glycidyl ether gradually to the mixture of the dihydroxy compound and the catalyst. Alternatively, the second-stage reactants may be melted together in the absence of solvents or diluents. The bis-glycidyl ether may be added gradually to the mixture of the dihydroxy compound and the catalyst in the form of a solution or suspension, for example in ethanol.

The two-stage process according to the invention involving the formation of an aromatic bis-glycidyl ether as an intermediary, may be employed for producing copolymeric resins by using in the second stage a different dihydroxy compound from that used in the first stage to produce the aromatic bis-glycidyl ether.

The single stage and two-stage processes according to the invention may be effected in the presence of water, aqueous alcohol, aqueous dioxane or other suitable diluent. It is preferred to carry out the condensation while the reaction mixture is stirred at high speed so that the polymer is precipitated in the form of a fine powder which can be readily separated, washed and dried.

The process according to the invention may also be effected by heating the three reactants together in the presence of a diluent until a low molecular-weight polymer is precipitated, separating this polymer and completing the condensation by heating the low molecular weight polymer in the molten state for example at temperatures of 200° centigrade or higher.

Examples of aromatic dihydroxy compounds for use in the present invention are resorcinol, hydroquinone, 3,3' and 4,4' dihydroxy diphenyls, dihydroxy diphenoxy ethanes, dihydroxy diphenyl methanes and diphenylol propanes, and 1:3, 1:4, 1:5, 1:6, 1:7, 1:8, 2:6 and 2:7 dihydroxy naphthalenes. Mixtures of aromatic dihydroxy compounds may also be used, the quantities used being such that the total number of phenolic hydroxyl groups is substantially equal to twice the number of molecules of epichlorhydrin. The dihydroxy compounds may also contain substituent groups which are inert to the other reactants, examples of such groups being halogen atoms, alkyl groups and alkoxy groups. The compounds should be free from groups such as amine or carboxyl groups which are reactive towards epichlorhydrin. It is also unnecessary to employ reactants of a particularly high degree of purity and in many cases commercial grades, for example of epichlorhydrin, may be used successfully in carrying out the invention. Dihydroxy compounds such as catechol or 1,2 dihydroxy naphthalene in which the OH groups are on adjacent carbon atoms condense by ring closure when reacted according to the invention and do not produce thermoplastic fibre-forming polymers.

The alkali is preferably caustic soda or caustic potash. The ratio of the number of molecules of alkali to the number of molecules of the aromatic dihydroxy compound is in the range of from 1.0 to 1.1. The actual proportion of alkali used in a single stage process in the presence of a diluent has a marked influence on the intrinsic viscosity of the product, the higher the proportion of alkali, the higher the intrinsic viscosity. This effect is shown by the following table of results which were obtained by condensing 1 mol of hydroquinone and 1 mol of epichlorhydrin for 6 hours under a reflux condenser in aqueous alcohol (2 volumes of alcohol to 1 volume of water) with various initial quantities of caustic soda:

| Molecules of caustic soda per molecule of hydroquinone | Intrinsic viscosity of product (1 per cent solution in meta-cresol). |
| --- | --- |
| 1.015 | .33 |
| 1.035 | .42 |
| 1.055 | .48 |
| 1.075 | .58 |
| 1.095 | .80 |

Intrinsic viscosity ($\eta i$) as referred to in this specification is defined as $$\eta i = \frac{\log_e \eta_{rel}}{c}$$

where $\eta_{rel}$ is the relative viscosity at 25° centigrade of a solution having a concentration of $c$ grams per 100 grams of solution.

The single stage process according to the invention may be effected simply by heating the three reactants together with the water, aqueous alcohol or other diluent, under a reflux condenser for several hours, for example, 6 hours; in this case a low molecular weight polymer is first precipitated and then undergoes further polymerisation on continued heating, the final resinous product being obtained as a powder. With this procedure the product is usually contaminated with alkali metal chloride formed in the reaction. This salt may be readily separated by boiling the product with water.

The process according to the invention may be effected in two stages by first heating the dihydroxy compound and the epichlorhydrin, preferably in the absence of a diluent, under a reflux condenser for example for 1 hour, then adding the alkali, the desired diluent and any further dihydroxy compound and continuing the heating under reflux until a fibre-forming product of the desired molecular weight is obtained.

It is preferred to inhibit oxidation of the polymer as far as possible during the condensation, for example by conducting the reaction under an atmosphere of an inert gas such as nitrogen and/or by adding a small proportion of a reducing agent such as sodium stannite to the initial reactants; alternatively a reducing agent may be formed in situ in the initial reaction mixture. By inhibiting oxidation as described, polymers of improved colour are obtained.

In accordance with a further embodiment of the invention, the epichlorhydrin may be formed in situ by using alpha- or beta-glycerol dichlorhydrin, or a mixture of both, with 1 molecular equivalent of caustic alkali in place of the epichlorhydrin. In this case, the caustic alkali used to react with the glycerol dichlorhydrin is additional to the alkali required to effect the reactions according to the invention.

The products obtained according to the invention are in general thermoplastic polymeric products of high molecular weight which can usually be drawn or melt-spun by standard methods to form threads generally capable of being cold drawn. When the resinous products are to be formed into threads by melt-spinning, it is desirable to prevent as far as possible any further polymerization during the heating and spinning operations and this may be effected by adding at any convenient stage of the condensation a small proportion, for example about 1 per cent, of a monofunctional compound which will react either with an aromatic hydroxyl group or with an epoxide ring; examples of such compounds are glycidol and phenol. These compounds are preferably added to the initial reactants. Alternatively further polymerisation may be substantially prevented by boiling the product with dilute aqueous hydrochloric acid or a similar reagent which is capable of destroying an epoxide ring.

The products made according to the invention are generally unaffected by mineral acids and alkalis and are generally insoluble in the usual organic solvents such as alcohol, acetone, benzene and carbon tetrachloride.

The intrinsic viscosities of the bulk of the polymeric products can in general be increased by extracting the polymer with a liquid which dissolves lower molecular weight polymers while having no appreciable solvent action on the higher molecular weight polymers; a suitable liquid for this purpose is glacial acetic acid.

The intrinsic viscosities of those polymers which have not been treated to prevent further polymerisation as described above may be increased by heating the polymers at high temperatures, for example of the order of 200° centigrade, in the absence of air, for example for 1 to 3 hours.

The polymeric products obtained according to the invention contain alcoholic hydroxyl groups. They are therefore capable of reacting with compounds such as acid chlorides, anhydrides acrylonitrile and oxidising agents which are known to react with such hydroxyl groups. In particular, the products react with poly-functional compounds capable of reacting with hydroxyl groups to produce cross-linked polymers. Examples of such poly-functional compounds are bi-functional compounds such as formaldehyde and its polymers, acetone, organic diisocyanates, organic diisothiocyanates, dicarboxylic acid chlorides, methylene diacetate and dibutyl formal, and trifunctional compounds such as organic triisocyanates. Specific examples of organic diisocyanates are 2,4- and 2,6-tolylene diisocyanates. The cross-linking reactions are particularly suitable for increasing the heat-resistance of the polymers; thus threads which are unsuitable for normal textile purposes because they soften at low temperatures, for example below 100° centigrade, can be considerably improved by treating them with polyfunctional compounds as described. Such treatment also improves the resistance of the threads to hot and boiling water.

The treatment with polyfunctional compounds may be effected by immersing the threads in a bath containing the polyfunctional compound or by passing the threads by means of suitable storage devices such as reels or rollers through a bath containing the polyfunctional compound. A catalyst may be added to the bath if desired and the bath may also be heated. The bath may also contain a swelling agent for the threads.

The invention is illustrated by the following examples in which the parts are by weight unless otherwise stated. In all examples the alcohol used was industrial spirit (64 overproof).

*Example 1*

A mixture of 110 parts of hydroquinone and 185 parts of epichlorhydrin was boiled for 30 minutes under a reflux condenser. A solution of 110 parts of hydroquinone in 800 parts of alcohol and a solution consisting of 80 parts of caustic soda in 500 parts of water were then added and the resultant mixture was heated under reflux for 3½ hours. The precipitate which formed was filtered off, washed with water and dried at room temperature in a vacuum desiccator.

The product, on heating, began to soften at about 100° centigrade and was molten at 120° centigrade; at this temperature it was drawn into threads which were capable of being cold drawn at least 100 per cent. A thread of denier 9 had a dry tenacity of 0.8 and an extensibility of 35 per cent. The intrinsic viscosity of the product measured as a 2 per cent solution in meta-cresol was 0.2.

*Example 2*

100 parts of hydroquinone and 185 parts of epichlorhydrin were refluxed together for 1 hour and then cooled. A solution of 110 parts of hydroquinone in 800 parts of alcohol and a solution of 80 parts of caustic soda in 500 parts of water were added to the cooled reaction product and the mixture was heated for 3 hours under a reflux condenser. The precipitated product was filtered off, washed with boiling water till free from sodium chloride, and then dried in a vacuum desiccator.

A 1 per cent solution of the product in meta-cresol had an intrinsic viscosity of 0.30. The product melted at 143° to 146° centigrade and in the molten state was readily drawn out into threads capable of being cold drawn at least 100 per cent.

*Example 3*

The procedure described in Example 1 was repeated but in this case resorcinol was used in place of the hydroquinone.

A reddish brown resin was obtained which softened at about 55° centigrade; on stretching, the product had a copper-coloured lustre.

*Example 4*

110 parts of hydroquinone dissolved in 800 parts of alcohol, 92.5 parts of epichlorhydrin and 40 parts of caustic soda dissolved in 250 parts of water were mixed together and the mixture was heated for 5 hours under a reflux condenser. The material which had separated was then boiled with N/100 hydrochloric acid and the resinous product was powdered and dried.

The product was a buff-coloured resin softening at about 138° to 142° centigrade; above these temperatures, it was drawn into fibres capable of being cold drawn but to a lesser extent than the product of Example 1. Its intrinsic viscosity, measured as a 1 per cent solution in meta-cresol, was 0.26.

*Example 5*

110 parts of hydroquinone and 92.5 parts of epichlorhydrin were refluxed together and the temperature indicated by a thermometer, the bulb of which was immersed in the vapour, was noted from time to time. The temperature remained constant at 115° centigrade (the boiling point of epichlorhydrin) until, after about 100 minutes' heating, it began to rise sharply. At this stage heating was stopped and, when the mixture was sufficiently cool the contents of the flask were dissolved in 400 parts of alcohol. Heating under reflux was then resumed and a solution of 40 parts of caustic soda in 250 parts of water was added over 25 minutes down the condenser. Heating was continued for 3 hours and the polymeric product which separated was removed, washed several times by boiling with water, and dried by vacuum desiccation at room temperature. The final product, which was similar to that of Example 1 had an intrinsic viscosity of 0.23.

*Example 6*

A product consisting of the mixed stereoisomers of 1:4-bis(2:3 epoxypropoxy) benzene, (otherwise known as hydroquinone bis-glycidyl ether) melting point 105° to 109° centigrade, was made by the method of Werner and Farenhorst referred to above. A suspension of 12 parts of this product in 28 parts of ethanol was added slowly and continuously over one hour, to a solution of 6 parts of hydroquinone and 0.25 part of caustic soda in 28 parts of ethanol and 1 part of water, the solution being boiled continuously under a reflux condenser. When the addition was completed, refluxing was continued for a further 3 hours. The ethanol was then distilled off using a steam bath, and the residue was washed with water, dried in an oven at 110° centigrade, ground to a coarse powder and finally dried in a vacuum over phosphorus pentoxide. The product melted at 140° centigrade and had intrinsic viscosities of 0.23 and 0.22 in 1 per cent solutions in morpholine and m-cresol respectively. It drew out into fibres at 140° to 150° centigrade and the fibres were capable of being cold drawn about 50 per cent.

*Example 7*

The product obtained as described in Example 4 was extracted in a Soxhlet for 1 hour with glacial acetic acid. This treatment removed lower molecular weight polymers with the result that the intrinsic viscosity of the main bulk of the polymer measured in a 1 per cent solution in meta-cresol was increased from 0.26 to 0.35.

*Example 8*

A polymer was made substantially as described in Example 5 with the only exception that the heating under reflux in the second stage, after the addition of the caustic soda solution, was carried out for only 1¼ hours. The product was then heated in an oil bath at 200° centigrade under a slow stream of oxygen-free nitrogen. Samples were removed at intervals and their intrinsic viscosities were determined, with the following results:

| Heating time (hours) | Intrinsic viscosity (1 per cent solution in m-cresol) |
|---|---|
| Nil | 0.149 |
| 1.0 | 0.195 |
| 1.5 | 0.209 |
| 2.5 | 0.232 |

*Example 9*

A polymer was obtained from epichlorhydrin and hydroquinone as follows:

110 parts of hydroquinone dissolved in 220 parts of alcohol, 92.5 parts of epichlorhydrin and 43 parts of caustic soda dissolved in 130 parts of water were mixed together and the mixture heated for 6 hours under a reflux condenser while stirring vigorously. The precipitated polymer was filtered off, washed with hot water, boiled for 30 minutes with N hydrochloric acid, washed again and dried.

The product was melt-spun into threads of approximately 30 denier. A sample of the threads produced was immersed for 90 seconds while under slight tension in a bath consisting of 25 volumes of a mixture of 2,4- and 2,6-tolylene diisocyanates, 75 volumes of carbon tetrachloride and 2 volumes of pyridine, the bath being heated to its boiling point. The threads were removed from the bath, washed with cold carbon tetrachloride and dried.

The improved properties of the threads obtained were demonstrated by the following tests:

(1) Samples of both treated and untreated threads were dropped into boiling water. The untreated threads shrivelled up while the treated threads were unaffected.

(2) Samples of both treated and untreated threads were put into narrow glass tubes which were then immersed in an oil bath, the temperature of which was then slowly raised. The untreated threads softened at about 75° centigrade where as the treated threads retained their fibrous structure even at 280° centigrade.

*Example 10*

The polymer from hydroquinone and epichlorhydrin produced as described in Example 9 was melt spun into threads of approximately 20 denier which were wound on to bobbins. One bobbin was immersed for 3 hours in a bath at 25° centigrade consisting of 1 volume of sebacyl chloride, 3 volumes of acetone and 9 volumes of carbon tetrachloride. The resultant thread was resistant to the action of boiling water and remained coherent when heated to 250° centigrade. The thread had an extensibility suitable for textile purposes and could be stretched when hot.

*Example 11*

A bobbin of 20 denier thread produced as described in Example 10 was immersed for 18 hours in a water-free solution at 25° centigrade consisting of 10 volumes of acetone, 10 volumes of carbon tetrachloride and 0.1 volume of boron trifluoride etherate. The resultant thread was coherent at 250° centigrade.

A similar improvement in heat resistance was obtained by immersing the thread for 18 hours at 25° centigrade in a 10 per cent solution of methylene diacetate in a mixture of ethyl acetate and carbon tetrachloride containing 1 per cent of boron trifluoride etherate.

*Example 12*

A mixture of 328.7 parts of hydroquinone and 618 parts of industrial alcohol were refluxed on a water bath for 15 minutes while stirring rapidly and a stream of oxygen-free nitrogen was passed through the apparatus to sweep out atmospheric oxygen. A solution of 126.1 parts of caustic soda in 370 parts of water was then added and refluxing continued, with stirring, for 10 minutes. With the water bath at 70° centigrade, 276.6 parts of epichlorhydrin were added at such a rate that the reaction mixture refluxed rapidly, this operation taking about 15 minutes. The temperature of the bath was then raised to 90° centigrade and the mixture was refluxed for 6 hours, the rapid stirring being continued throughout.

The product, which was precipitated as a finely-divided white powder, was filtered off, washed with hot distilled water, boiled with N/2 hydrochloric acid for ½ hour to destroy any epoxide rings present, filtered, boiled with distilled water and filtered again; the product was then dried, first at 110° centigrade in an air oven and finally in a vacuum desiccator.

The dried product was a white crystalline powder, melting point 145° to 150° centigrade and intrinsic viscosity, measured on a 1 per cent solution in meta-cresol, 0.43. It was readily melt spun to form threads capable of being cold drawn.

*Example 13*

A mixture of 325.4 parts of hydroquinone, 5.64 parts of phenol and 618 parts of alcohol was refluxed on a water bath for 15 minutes while stirring rapidly and passing oxygen-free nitrogen through the apparatus to sweep out atmospheric oxygen. The mixture was then treated with 126.1 parts of caustic soda and 276.6 parts of epichlorhydrin as described in Example 12.

The product, which was precipitated as a finely divided white powder, was isolated as described in Example 12. The phenol added to the initial reactants served to reduce or prevent polymerisation of the product during melt spinning.

The dried product was a white crystalline powder with an intrinsic viscosity as a 1 per cent solution in meta-cresol of 0.39. It was readily melt-spun to form threads capable of being cold drawn.

*Example 14*

A mixture of 321.6 parts of hydroquinone, 2.77 parts of phenol, 1 part of stannous chloride dihydrate ($SnCl_2 2H_2O$) dissolved in 5 parts of water, and 626 parts of alcohol were refluxed together on a water bath, treated with 126.1 parts of caustic soda and 271.8 parts of epichlorhydrin as described in Example 12. The product was separated as described in Example 12.

The dried product was a white crystalline powder having an intrinsic viscosity of 0.43 measured on a 1 per cent solution in meta-cresol. It was readily melt-spun to form threads capable of being cold drawn.

*Example 15*

A mixture of 18.5 parts of epichlorhydrin, 22.0 parts of hydroquinone, a solution of 8.76 parts of caustic soda in a mixture of 27.8 parts of water and 17.5 parts of alcohol, and 25 parts of alcohol was heated under reflux on a water bath with vigorous stirring for 6 hours.

The product, which was precipitated as a pale brown powder, was washed twice by boiling with distilled water and was dried in an air oven at 110° centigrade for 1 hour. The intrinsic viscosity of the dried product, measured on a 1 per cent solution in meta-cresol, was 0.80.

*Example 16*

The procedure described in Example 15 was repeated using 18.3 parts of epichlorhydrin instead of 18.5 parts and refluxing for 6½ hours instead of for 6 hours. A product similar to that produced in Example 15 was obtained, its intrinsic viscosity also being 0.80.

*Example 17*

A mixture of 18.7 parts of epichlorhydrin, 22.0 parts of hydroquinone, a solution of 8.76 parts of caustic soda in a mixture of 27.8 parts of water and 17.5 parts of alcohol, and 25 parts of alcohol was heated under reflux on a water bath with vigorous stirring for 3½ hours. The product was separated as described in Example 15; its intrinsic viscosity measured as a 1 per cent solution in meta-cresol was 0.75.

In carrying out the procedure described in Examples 15, 16 and 17 a considerable quantity of heat is evolved particularly during the initial stages of the reaction and care should therefore be taken to ensure that the reaction mixture does not boil over.

*Example 18*

22.8 parts of diphenylolpropane

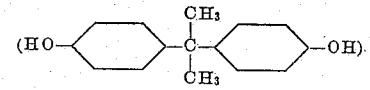

9.25 parts of epichlorhydrin, 24 parts of alcohol and a solution of 4.40 parts of caustic soda dissolved in 12.9 parts of water were heated together under reflux and with stirring on a water bath for 6 hours. The product was isolated as described in Example 12. It was a fibre-forming white powder melting at 160° to 165° centigrade and having an intrinsic viscosity, as a 1 per cent solution in meta-cresol, of 0.43.

*Example 19*

18.6 parts of p,p'-dihydroxy diphenyl, 9.25 parts of epichlorhydrin, 4.24 parts of caustic soda dissolved in 10.9 parts of water, and 78 parts of dioxane were heated under reflux with vigorous stirring on a steam bath at 100° centigrade for 5½ hours.

The product, which was precipitated as a pale yellow powder was isolated as described in Example 12. It had an intrinsic viscosity, measured as a 1 per cent solution in morpholine, of 0.35 and it melted at approximately 300° centigrade; threads were drawn from the melt.

*Example 20*

6.48 parts of epichlorhydrin, 11.7 parts of p,p'-dihydroxy diphenyl, 0.77 part of hydroquinone, 3.02 parts of caustic soda dissolved in 7.8 parts of water, and 72 parts of dioxane were mixed together and heated under reflux with vigorous stirring for 6 hours at 100° centigrade. The product was isolated as described in Example 12.

The product was a pale yellow powder having an intrinsic viscosity, measured as a 1 per cent solution in morpholine, of 0.29.

*Example 21*

9.25 parts of epichlorhydrin, 12.4 parts of p,p'-dihydroxy diphenyl, 3.63 parts of hydroquinone, 4.32 parts of caustic soda dissolved in 11.0 parts of water, and 96 parts of alcohol were heated together under reflux with rapid stirring for 6 hours. The product, isolated as described in Example 12, had an intrinsic viscosity, measured as a 1 per cent solution in morpholine, of 0.20.

*Example 22*

A mixture of 321.6 parts of hydroquinone, 2.77 parts of phenol, 1 part of stannous chloride dihydrate, dissolved in 5 parts of water and 460 parts of alcohol was refluxed together on a water bath for 15 minutes while stirring rapidly and passing a stream of oxygen-free nitrogen through the apparatus to sweep out atmospheric oxygen. A solution of 126.1 parts of caustic soda dissolved in 370 parts of water were then added and refluxing continued, with stirring, for 10 minutes. 199 parts of water were then added and then 271.8 parts of epichlorhydrin were added over a period of 15 minutes; the resultant mixture was refluxed for 6 hours, the rapid stirring being continued throughout.

The product was isolated as described in Example 12. It was a white crystalline powder, melting point 145° to 150° centigrade, and intrinsic viscosity, measured on a 1 per cent solution in meta-cresol of 0.51. It was readily melt spun to form threads capable of being cold drawn.

Example 23

A mixture of 9.3 parts of 4,4'-dihydroxy diphenyl, 11.1 parts of hydroquinone bis-glycidyl ether and a trace of solid sodium carbonate were heated for 3 hours at 240° to 260° centigrade in a stream of oxygen-free nitrogen.

The product obtained was fibre-forming, had a melting point of approximately 190° centigrade and an intrinsic viscosity, measured as a 1 per cent solution in meta cresol of 0.25.

Example 24

A mixture of 18.5 parts of epichlorhydrin, 22.0 parts of hydroquinone and a solution of 8.28 parts of caustic soda in 26.3 parts of water and 17 parts of alcohol was heated under reflux for 6 hours while stirring vigorously. The product was washed with boiling distilled water for ½ hour and dried. Its intrinsic viscosity, measured as a 1 per cent solution in meta-cresol, was 0.43.

The product was then heated to 200° centigrade in the absence of oxygen for 1¼ hours. The intrinsic viscosity of the product was thereby raised to 0.55. It was readily melt spun to form threads capable of being cold drawn.

If the original product is first stabilised by boiling for ½ hour in N/5 hydrochloric acid, the heat-treatment described only raises the intrinsic viscosity to 0.45.

Example 25

The hydroquinone-epichlorhydrin polymeric product obtained as described in Example 22 was melt-spun to form a 6 filament, 30 denier per filament thread and the thread was passed through a bath at 65° centigrade consisting of 57.5 volumes of a mixture of 2:4 and 2:6 tolylene diisocyanates, 155 volumes of xylene and 17.5 volumes of pyridine. The thread was stretched 80 per cent during its passage through the bath. The immersion time in the bath was approximately 1 minute. The thread was then washed in carbon tetrachloride and dried. The resulting thread remained coherent at 250° centigrade and was substantially unaffected by boiling water.

A similar effect was obtained using the same bath at 70° centigrade and washing with a mixture of 4 volumes of carbon tetrachloride and 1 volume of alcohol.

Example 26

The hydroquinone-epichlorhydrin polymer obtained as described in Example 22 was melt spun to form a 14 filament, 30 denier per filament thread. The thread was passed through a bath at 74° centigrade containing 1 volume of a mixture of 2:4 and 2:6 tolylene diisocyanates and 4 volumes of xylene; the immersion time was 50 seconds and a stretch of 80 per cent was imposed in the bath. The thread was then passed through a second bath at 86° centigrade containing 57.5 volumes of a mixture of 2:4 and 2:6 tolylene diisocyanates, 155 volumes of xylene and 17.5 volumes of pyridine; the immersion time was 50 seconds and a stretch of 5 per cent was imposed in the bath. The thread was then washed with carbon tetrachloride and dried. The final thread was resistant to boiling water and was coherent at 230° centigrade.

Example 27

A 130 denier monofil of the epichlorhydrin-hydroquinone polymer obtained as described in Example 12 was immersed at 20° centigrade for 30 seconds in a bath consisting of equal volumes of a mixture of 2:4 and 2:6 tolylene diisocyanates, pyridine and carbon tetrachloride. The monofil was then washed in carbon tetrachloride and dried. The final monofil was coherent at temperatures above 250° centigrade.

Example 28

22.2 parts of hydroquinone bis-glycidyl ether, 16 parts of 1:5 dihydroxynaphthalene and 0.08 part of sodium carbonate were heated together at 200° centigrade for 2 hours. The product was a fibre-forming polymer melting at 110° centigrade, approximately.

Example 29

A mixture of 327.3 parts of resorcinol, 2.77 parts of phenol, 1 part of stannous chloride dihydrate dissolved in 5 parts of water, and 626 parts of alcohol were refluxed together on a water bath and then treated with 126.8 parts of caustic soda dissolved in 370 parts of water and 273.8 parts of epichlorhydrin as described in Example 12. The product was separated as described in Example 12.

The product was a white fibre-forming solid melting at 50° to 62° centigrade.

What we claim is:

1. A process for the production of thermoplastic fiber-forming resins which comprises condensing equimolecular proportions of epichlorhydrin and at least one aromatic dihydroxy compound in which the hydroxyl groups are phenolic and the carbon atoms linked to the hydroxyl groups are separated by at least one other carbon atom, the said compound being otherwise free from groups which are reactive towards epichlorhydrin, together with a quantity of an alkali, such that the ratio of the number of molecules of the alkali to the number of molecules of the dihydroxy compound is within the range of 1.0 to 1.1, and heating until a fiber-forming resinous condensation product is formed.

2. A process as claimed in claim 1 wherein the aromatic dihydroxycompound used is hydroquinone.

3. A process as claimed in claim 1 wherein the reaction is carried out for at least part of the heating time in the presence of a diluent.

4. A process as claimed in claim 3 wherein the heating is carried out in the presence of a diluent until a low molecular weight polymer is precipitated, the low molecular weight polymer is separated and the condensation completed by heating the low molecular weight polymer in the molten condition.

5. A process for the production of thermoplastic fiber-forming resins which comprises condensing equimolecular proportions of epichlorhydrin and at least one aromatic dihydroxy compound in which the hydroxyl groups are phenolic and the carbon atoms linked to the hydroxyl groups are separated by at least one other carbon atom the said compound being otherwise free from groups which are reactive towards epichlorhydrin, together with a quantity of an alkali such that the ratio of the number of molecules of the alkali to the number of molecules of the dihydroxy compound is within the range of 1.0 to 1.1 in two stages comprising first reacting the epichlorhydrin with from 50 to 100 per cent of the aromatic dihydroxy compound and then heating the product so obtained with the alkali and from 50 to 0 per cent of the aromatic dihydroxy compound until a fiber-forming resinous product is obtained.

6. A process as claimed in claim 5 wherein the first stage of the condensation is carried out by heating the epichlorhydrin and the aromatic dihydroxy compound together in the absence of a diluent and the second stage of the condensation is carried out in the presence of a diluent.

7. A process as claimed in claim 5 wherein the aromatic dihydroxy compound used is hydroquinone.

8. A process for the production of thermoplastic fiber-forming resins which comprises condensing equimolecular proportions of epichlorhydrin and at least one aromatic dihydroxy compound in which the hydroxyl groups are phenolic and the carbon atoms linked to the hydroxyl groups are separated by at least one other carbon atom, the said compound being otherwise free from groups which are reactive towards epichlorhydrin, together with a quantity of an alkali, such that the ratio of the number of molecules of the alkali to the number of molecules of the dihydroxy compound is within the range of 1.0 to 1.1, in two stages comprising first reacting two molecular proportions of epichlorhydrin with one molecular proportion of the dihydroxy compound to form an aromatic bis-glycidyl ether and then heating the aromatic bis-glycidyl ether with a further molecular proportion of a dihydroxy compound as defined, together with a small proportion of an alkali catalyst, until a fiber-forming resinous product is obtained.

9. A process as claimed in claim 8 wherein the second stage of the reaction is effected in the presence of a diluent, the bis-glycidyl ether and the diluent being added gradually to a mixture of the dihydroxy compound and the catalyst.

10. A process as claimed in claim 8 wherein the second stage of the reaction is effected by heating the bis-glycidyl ether, the catalyst and the dihydroxy compound together in a molten condition until a fibre-forming product is obtained.

11. A process as claimed in claim 8 wherein different dihydroxy compounds are used in the two stages of the reaction.

12. A process as claimed in claim 8 wherein the aromatic dihydroxy compound used is hydroquinone.

A. STANLEY CARPENTER.
FRANK REEDER.
E. R. WALLSGROVE.

REFERENCES CITED

The following references are of record in the file of this patent:

UNITED STATES PATENTS

| Number | Name | Date |
|---|---|---|
| 2,060,715 | Arvin | Nov. 10, 1936 |
| 2,500,600 | Bradley | Mar. 14, 1950 |
| 2,500,765 | Montague | Mar. 14, 1950 |
| 2,504,518 | Greenlee | Apr. 18, 1950 |